United States Patent

Hsu et al.

[11] Patent Number: 5,981,639
[45] Date of Patent: Nov. 9, 1999

[54] STABILIZATION OF TIN-COUPLED POLYMERS

[75] Inventors: Wen-Liang Hsu, Cuyahoga Falls; Adel Farhan Halasa, Bath, both of Ohio

[73] Assignee: The Goodyear Tire & Rubber Company, Akron, Ohio

[21] Appl. No.: 09/058,572

[22] Filed: Apr. 10, 1998

Related U.S. Application Data

[63] Continuation-in-part of application No. 08/791,929, Jan. 31, 1997, Pat. No. 5,739,182.
[51] Int. Cl.$^6$ .............................. C08K 5/04; C08K 5/09
[52] U.S. Cl. .......................................... 524/394; 524/396
[58] Field of Search ...................... 524/394, 396

[56] References Cited

U.S. PATENT DOCUMENTS

| | | | |
|---|---|---|---|
| 5,268,439 | 12/1993 | Hergenrother | 526/340 |
| 5,623,035 | 4/1997 | Halasa et al. | 526/183 |
| 5,629,375 | 5/1997 | Jenkins et al. | 524/556 |
| 5,679,751 | 10/1997 | Halasa et al. | 526/174 |

*Primary Examiner*—Kriellion Sanders
*Attorney, Agent, or Firm*—Alvin T Rockhill

[57] ABSTRACT

The process of this invention can be utilized to stabilize tin-coupled rubbery polymers. This process involves adding a chelating diamine or a sodium alkoxide to the rubbery polymer after the tin coupling has been carried out. This invention more specifically discloses a process for improving the stability of a tin-coupled rubbery polymer which comprises adding a sodium alkoxide to the tin-coupled rubbery polymer subsequent to the time at which the tin-coupled rubbery polymer is coupled. Sodium alkoxide is a representative example of a sodium alkoxide that can be used to stabilize the tin-coupled rubbery polymer.

19 Claims, No Drawings

5,981,639

STABILIZATION OF TIN-COUPLED POLYMERS

This is a continuation-in-part application of U.S. patent application Ser. No. 08/791,929, filed on Jan. 31, 1997, now U.S. Pat. No. 5,739,782.

BACKGROUND OF THE INVENTION

Tin-coupled polymers are known to provide desirable properties, such as improved treadwear and reduced rolling resistance, when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent thereby coupling the polymer. For instance, up to four live chain ends can react with tin tetrachloride thereby coupling the polymer chains together.

The coupling efficiency of the tin coupling agent is dependant on many factors, such as the quantity of live chain ends available for coupling and the quantity and type of polar modifier, if any, employed in the polymerization. For instance, tin coupling agents are generally not as effective in the presence of polar modifiers. In any case, the actual number of live chain ends in the rubbery polymer is difficult to quantify. As a result, there is normally unreacted tin coupling agent left in the polymer cement after the coupling process has been completed.

The free tin coupling agent is then available to react with any active protons present in the polymer cement to form hydrochloric acid. For example, excess tin coupling agent can react with most hydroxyl group containing polymerization shortstops or moisture from the air. The acid generated can then cleave the tin-carbon bonds in the tin-coupled polymer. Undesirable polymer degradation is, of course, the result of the tin-carbon bonds in the rubbery polymer being cleaved. This polymer degradation is normally evidenced by a drop in the Mooney viscosity and molecular weight of the polymer.

SUMMARY OF THE INVENTION

This invention relates to a process for improving the stability of a tin-coupled rubbery polymer which comprises adding a tertiary chelating amine, a sodium alkoxide, a sodium alkyl sulfonate or a sodium aryl sulfonate to the tin-coupled rubbery polymer subsequent to the time at which the tin-coupled rubbery polymer is coupled. Sodium amylate is a representative example of sodium alkoxide that can be utilized in the process of this invention.

DETAILED DESCRIPTION OF THE INVENTION

The process of this invention is applicable to virtually any type of tin-coupled rubbery polymer. Such tin-coupled rubbery polymers will typically be synthesized by a solution polymerization technique utilizing an organolithium compound as the initiator.

Such polymerizations will normally be carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomer. It is generally more preferred for the polymerization medium to contain 15 to 20 weight percent monomers.

The tin-coupled rubbery polymers stabilized in accordance with this invention can be made by the homopolymerization of a conjugated diolefin monomer or by the copolymerization of a conjugated diolefin monomer with a vinyl aromatic monomer. It is, of course, also possible to make rubbery polymers which can be tin-coupled by polymerizing a mixture of conjugated diolefin monomers with one or more ethylenically unsaturated monomers, such as vinyl aromatic monomers. The conjugated diolefin monomers which can be utilized in the synthesis of rubbery polymers which can be tin-coupled and stabilized in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be synthesized into rubbery polymers which can be tin-coupled and stabilized in accordance with this invention include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, $\alpha$-methylstyrene, bromostyrene, chlorostyrene, fluorostyrene and the like; $\alpha$-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; $\alpha,\beta$-olefinically unsaturated nitriles, such as acrylonitrile and methacrylonitrile; $\alpha,\beta$-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubber copolymers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polycienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers which can be tin-coupled and stabilized in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber.

The polymerizations employed in making the rubbery polymer are typically initiated by adding an organolithium initiator to an organic polymerization medium which contains the monomers. Such polymerization can be carried out utilizing batch, semi-continuous or continuous techniques.

The organolithium initiators which can be employed in synthesizing tin-coupled rubbery polymers which can be stabilized by utilizing the technique of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule, from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane and the like.

Exemplary multivinylphosphine compounds include trivinylphosphine, methyldivinylphosphine, dodecyldivinylphosphine, phenyldivinylphosphine, cyclooctyldivinylphosphine and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene and the like. Divinyl aromatic hydrocarbons containing up to 18 carbon atoms per molecule are preferred, particularly divinylbenzene as either the ortho, meta or para isomer and commercial divinylbenzene, which is a mixture of the three isomers, and other compounds, such as the ethylstyrenes, also is quite satisfactory.

Other types of multifunctional initiators can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, it desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeiosane, 1,3,5-trilithiocyclohexane, 1,3,5,8-tetrathiodecane, 1,5,10,20-tetralithioeicosane, 1,2,4,6-tetralithiocyclohexane, 4,4,1-dilithiobiphenyl and the like.

The polymerization temperature utilized can vary over a broad range of from about −20° C. to about 180° C. In most cases, a temperature within the range of about 30° C. to about 125° C. will be utilized. It is typically most preferred for the polymerization temperature to be within the range of about 60° C. to about 85° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization is then terminated by the addition of a tin coupling agent. Tin coupling agents can normally be used in order to improve the cold flow characteristics of the rubbery polymer and rolling resistance of tires made therefrom. Tin coupling also leads to better processability and other beneficial properties.

The tin coupling agent will normally be a tin tetrahalide, such as tin tetrachloride, tin tetrabromide, tin tetrafluoride or tin tetraiodide. However, tin trihalides or tin dihalides can also optionally be used. In cases where tin dihalides are utilized, a linear polymer rather than a branched polymer results. To induce a higher level of branching, tin tetrahalides are normally preferred. As a general rule, tin tetrachloride is most preferred.

Broadly, and exemplarily, a range of about 0.01 to 4.5 milliequivalents of tin coupling agent is employed per 100 grams of the rubbery monomer. It is normally preferred to utilize about 0.01 to about 1.5 milliequivalents of the tin coupling agent per 100 grams of monomer to obtain the desired Moorey viscosity. The larger quantities tend to result in production of polymers containing terminally reactive groups or insufficient coupling. One equivalent of tin coupling agent per equivalent of lithium is considered an optimum amount for maximum branching. For instance, if a tin tetrahalide is used as the coupling agent, one mole of the tin tetrahalide would be utilized per four moles of live lithium ends. In cases where a tin trihalide is used as the coupling agent, one mole of the tin trihalide will optimally be utilized for every three moles of live lithium ends. The tin coupling agent can be added in a hydrocarbon solution, e.g., in cyclohexane, to the polymerization admixture in the reactor with suitable mixing for distribution and reaction.

After the tin coupling has been completed, a tertiary chelating alkyl 1,2-ethylene diamine, a sodium alkoxide, a sodium alkyl sulfonate or a sodium aryl sulfonate is added to the polymer cement to stabilize the rubbery polymer. The sodium alkoxides which can be utilized in the practice of this invention will normally be of the formula NaOR, wherein R is an alkyl group containing from about 2 to about 24 carbon atoms. The sodium metal alkoxide will typically contain from about 4 to about 20 carbon atoms. It is generally preferred for the sodium alkoxide to contain from about 5 to about 16 carbon atoms. Sodium t-amyloxide (sodium t-pentoxide) is a representative example of a preferred sodium alkoxide.

Sodium aryloxides can also be used to stabilize tin coupled rubbery polymers by the process of this invention. The sodium aryloxides that can be used are normally of the formula NaOR wherein R is an aryl group or an alkaryl group that contains from about 6 to about 24 carbon atoms.

The sodium alkyl sulfonates that can be utilized are of the formula $NaSO_3R$ wherein R represents an alkyl group that contains from about 2 to about 24 carbon atoms. The sodium aryl sulfonates that can be used are of the structural formula:

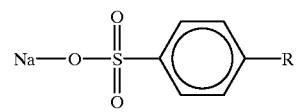

wherein R represents a hydrogen atom or an alkyl group containing from 1 to about 24 carbon atoms. Sodium dodecylsulfonate is a representative example of such a sodium aryl sulfonate. In cases where a sodium alkyl sulfonate is used it should be as pure as possible and free of acid. If even a small amount of acid is present it will be necessary to further include a tertiary chelating amine, such as N,N,N', N'-tetramethylethylenediamine (TMEDA).

The tertiary chelating amines which can be used are normally chelating alkyl diamines of the structural formula:

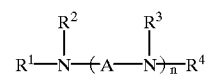

wherein n represents an integer from 1 to about 6, wherein A represents an alkylene group containing from 1 to about 6 carbon atoms and wherein $R^1$, $R^2$, $R^3$ and $R^4$ can be the same or different and represent alkyl groups containing from 1 to about 6 carbon atoms. The alkylene group A is the formula $-(-CH_2-)_m$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for $R^1$, $R^2$, $R^3$ and $R^4$ to represent alkyl groups which contain from 1 to 3 carbon atoms. In most cases, $R^1$, $R^2$, $R^3$ and $R^4$ will represent methyl groups.

The tertiary chelating amines which can be employed can also be cyclic tertiary chelating amines selected from the group consisting of (1) N,N'-dialkyl piperazine which has the structural formula

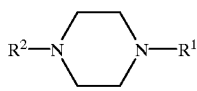

(2) 1,4-diazabicyclo[2,2,2]octane which has the structural formula

(3) N,N-tetraalkyl-1,2-diaminocycloalkanes which are of the structural formula

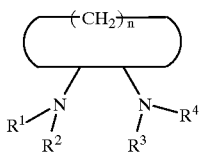

wherein n is an integer from 1 to 6 and wherein $R^1$, $R^2$, $R^3$ and $R^4$ can be the same or different and represent alkyl groups containing from 1 to about 6 carbon atoms, (4) N,N',N",N'"-tetraalkyl-1,4,8,11-tetraazacyclododecanes which are of the structure

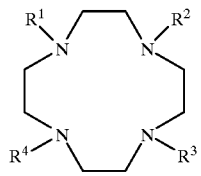

wherein $R^1$, $R^2$, $R^3$ and $R^4$ can be the same or different and represent alkyl groups containing from 1 to about 6 carbon atoms and (5) N,N',N"-trialkyl-1,4,7-triazacyclononanes which are of the structural formula

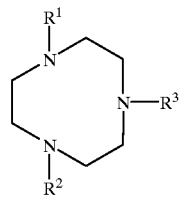

wherein $R^1$, $R^2$ and $R^3$ can be the same or different and represent alkyl groups containing from 1 to about 6 carbon atoms.

A sufficient amount of the chelating amine should be added to complex with any residual tin coupling agent remaining after completion of the coupling reaction.

In most cases, from about 0.01 phr (parts by weight per 100 parts by weight of dry rubber) to about 2 phr of the chelating alkyl 1,2-ethylene diamine will be added to the polymer cement to stabilize the rubbery polymer. Typically, from about 0.05 phr to about 1 phr of the chelating alkyl 1,2-ethylene diamine will be added. More typically, from about 0.1 phr to about 0.6 phr of the chelating alkyl 1,2-ethylene diamine will be added to the polymer cement to stabilize the rubbery polymer.

After the polymerization, tin coupling and stabilization has been completed, the rubbery polymer can be recovered from the organic solvent. The rubbery polymer can be recovered from the organic solvent and residue by means such as decantation, filtration, centrification and the like. It is often desirable to precipitate the rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the rubbery polymer from the polymer cement also "kills" any remaining living polymer by inactivating lithium end groups. After the rubbery polymer is recovered from the solution, steam-stripping can be employed to reduce the level of volatile organic compounds in the rubbery polymer.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, 0.5 mmol of N,N,N',N'-tetramethylethylenediamine (TMEDA) was added to 250 grams of tin-coupled styrene-butadiene rubber (SBR) cement having a solids content of 15 percent. The SBR cement had been freshly coupled with tin tetrachloride ($SnCl_4$) shortly before the TMEDA was added. The fresh SBR sample had a Mooney ML-4 viscosity at 100° C. of 90. Then the cement was stored at ambient temperature for 5 days. The Mooney ML-4 viscosity of the SBR sample was again measured and was determined to be 91 after having been stored for 5 days. Thus, the Mooney ML-4 viscosity of the SBR sample did not change appreciably during the five-day period. The fact that the Mooney viscosity did not change significantly during storage indicates that polymer degradation did not occur during storage.

COMPARATIVE EXAMPLE 2

This experiment was conducted at a control. The procedure utilized in Example 1 was repeated in this experiment except that TMEDA was not added to the SBR cement. During the five-day storage period, the Mooney ML-4 viscosity of the SBR dropped to 81. This 9-point drop in Mooney viscosity indicates that a significant degree of polymer degradation occurred when the TMEDA was not present in the polymer cement.

COMPARATIVE EXAMPLE 3

This experiment was conducted at a comparative example where additional tin tetrachloride was added to the polymer cement. The procedure utilized in Example 1 was repeated in this experiment except that 0.5 mmol of additional tin tetrachloride was added to the SBR cement in place of the TMEDA. During the five-day storage period, the Mooney ML-4 viscosity of the SBR dropped to 28. This 62-point drop in Mooney viscosity shows that a large amount of polymer degradation occurs when a significant excess of tin coupling agent is present in the polymer cement.

The results of Example 1 and Comparative Examples 2 and 3 are summarized in Table I. As can be seen, the TMEDA stabilized the SBR sample (there was no significant change in the Mooney ML-4 of the rubber). However, significant polymer degradation occurred in the controls which were not stabilized with a tertiary chelating alkyl 1,2-ethylene diamine. This polymer degradation is exemplified by the large drops in the Mooney ML-4 viscosities of the SBR samples.

TABLE I

| Example | Additive | ML-4 | ML-4 Change |
|---------|----------|------|-------------|
| 1 | TMEDA | 91 | +1 |
| 2 | none | 81 | −9 |
| 3 | $SnCl_4$ | 28 | −62 |

EXAMPLE 4 AND COMPARATIVE EXAMPLE 5

In Example 4, sodium amylate was added to a tin-coupled isoprene-butadiene rubber cement and in Comparative Example 5 sodium methoxide was added to a second sample of the tin-coupled isoprene-butadiene rubber. The sodium amylate or sodium methoxide was added to the tin-coupled isoprene-butadiene at a 1:1 molar ratio to the amount of tin tetrachloride used in coupling the polymer. The styrene-butadiene rubber cement had been freshly coupled shortly before the sodium amylate or sodium methoxide was added. The isoprene-butadiene rubber contained 30 percent bound isoprene and 70 percent bound butadiene.

The rubber samples had an initial Mooney ML-4 viscosity at 100° C. of about 90. The tin-coupled styrene-butadiene rubber samples were aged in an oven at a temperature of 150° F. (66° C.) for a period of 21 days. The Mooney ML-4 viscosity of the rubber samples was measured after periods of 5 days, 8 days, 15 days and 21 days. The Mooney ML-4 viscosities that were measured are after these time intervals are reported in Table II.

TABLE II

| Example | 4 | 5 |
|---------|---|---|
| Additive | Na amylate | Na methoxide |
| ML-4 Change @ 5 days | +2 | +10 |
| ML-4 Change @ 8 days | +5 | +17 |
| ML-4 Change @ 15 days | +8 | +28 |
| ML-4 Change @ 21 days | +10 | +32 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for improving the stability of a tin-coupled rubbery polymer which comprises adding a sodium alkoxide to the tin-coupled rubbery polymer subsequent to the time at which the tin-coupled rubbery polymer is coupled.

2. A process as specified in claim 1 wherein the sodium alkoxide is of the formula NaOR wherein R represents an alkyl group that contains from about 2 to about 24 carbon atoms.

3. A process as specified in claim 2 wherein from about 0.01 phr to about 2 phr of the sodium alkoxide is added to the polymer cement to stabilize the rubbery polymer.

4. A process as specified in claim 1 wherein the rubbery polymer is selected from the group consisting of polybutadiene rubber, polyisoprene rubber, styrene-butadiene rubber, α-methylstyrene-butadiene rubber, α-methylstyrene-isoprene rubber, styrene-isoprene-butadiene rubber, styrene-isoprene rubber, isoprene-butadiene rubber, α-methylstyrene-isoprene-butadiene rubber and α-methylstyrene-styrene-isoprene-butadiene rubber.

5. A process as specified in claim 1 wherein the tin-coupled rubbery polymer is tin-coupled with tin tetrachloride.

6. A process as specified in claim 4 wherein from about 0.05 phr to about 1 phr of the sodium alkoxide is added to the polymer cement to stabilize the rubbery polymer.

7. A process as specified in claim 6 wherein the sodium alkoxide is of the formula NaOR wherein R represents an alkyl group that contains from about 4 to about 20 carbon atoms.

8. A process as specified in claim 7 wherein the tin-coupled rubbery polymer is tin-coupled with tin tetrachloride.

9. A process as specified in claim 8 wherein from about 0.1 phr to about 0.6 phr of the sodium alkoxide is added to the polymer cement to stabilize the rubbery polymer.

10. A process as specified in claim 9 wherein the sodium alkoxide is of the formula NaOR wherein R represents an alkyl group that contains from about 5 to about 16 carbon atoms.

11. A process as specified in claim 9 wherein the sodium alkoxide is sodium amylate.

12. A process for improving the stability of a tin-coupled rubbery polymer which comprises adding a sodium aryl sulfonate to the tin-coupled rubbery polymer subsequent to the time at which the tin-coupled rubbery polymer is coupled.

13. A process as specified in claim 12 wherein the sodium aryl sulfonate is sodium dodecylbenzene sulfonate.

14. A process as specified in claim 13 wherein from about 0.01 phr to about 2 phr of the sodium dodecylbenzene sulfonate is added to the polymer cement to stabilize the rubbery polymer.

15. A process as specified in claim 13 wherein from about 0.05 phr to about 1 phr of the sodium dodecylbenzene sulfonate is added to the polymer cement to stabilize the rubbery polymer.

16. A process as specified in claim 13 wherein from about 0.1 phr to about 0.6 phr of the sodium dodecylbenzene sulfonate is added to the polymer cement to stabilize the rubbery polymer.

17. A process as specified in claim 13 wherein the tin-coupled rubbery polymer is tin-coupled with tin tetrachloride.

18. A process for improving the stability of a tin-coupled rubbery polymer which comprises adding a sodium alkyl sulfonate to the tin-coupled rubbery polymer subsequent to the time at which the tin-coupled rubbery polymer is coupled.

19. A process as specified in claim 18 wherein from about 0.01 phr to about 2 phr of the sodium alkyl sulfonate is added to the polymer cement to stabilize the rubbery polymer.

* * * * *